INVENTOR
Joseph T. Warkoczewski

ATTORNEYS

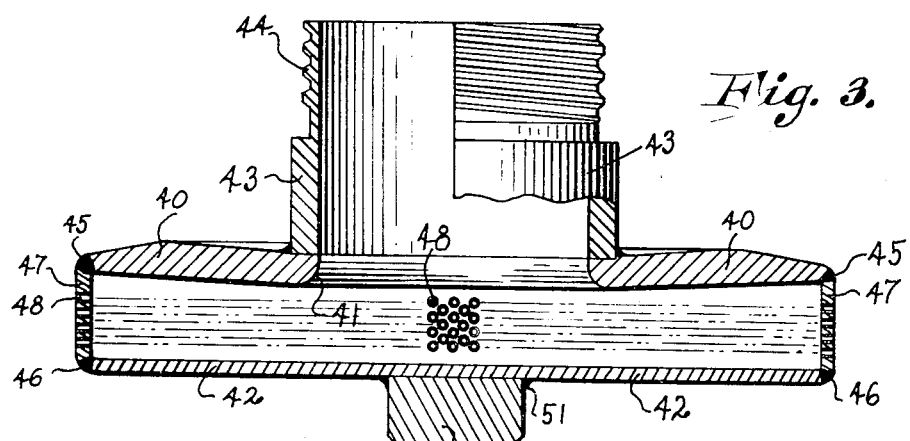
Fig. 3.
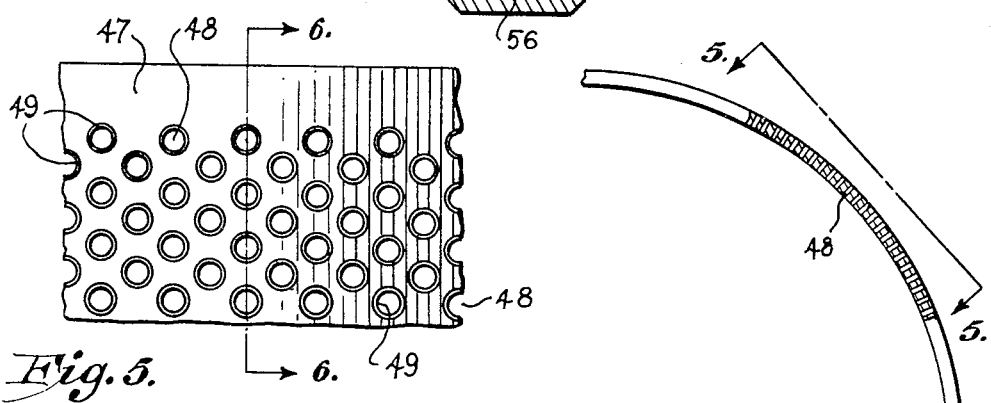
Fig. 5.
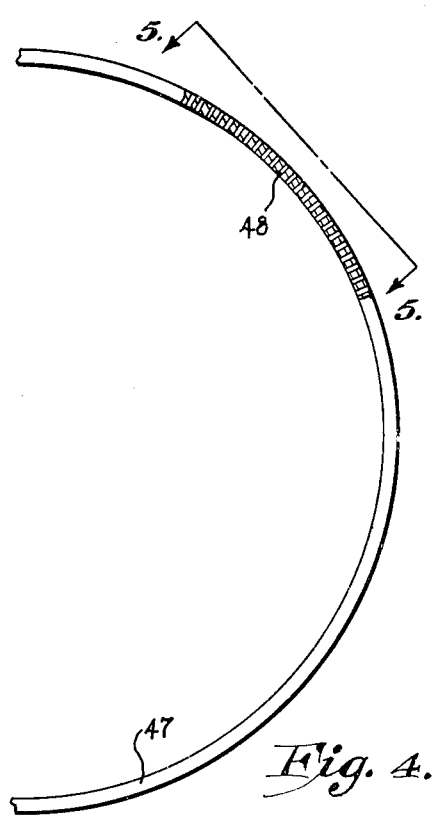
Fig. 4.
Fig. 6.
Fig. 7.
INVENTOR
Joseph T. Warkoczewski
ATTORNEYS

United States Patent Office 3,511,306
Patented May 12, 1970

3,511,306
METHOD AND APPARATUS FOR CENTRIFUGALLY CASTING PERFORATED RINGS
Joseph T. Warkoczewski, Overland Park, Kans., assignor to Certain-Teed Saint Gobain Insulation Corporation, Bala Cynwyd, Pa., a corporation of Maryland
Original application Oct. 25, 1966, Ser. No. 589,444. Divided and this application Mar. 17, 1969, Ser. No. 816,475
Int. Cl. C03b *37/04;* B22b *19/00*
U.S. Cl. 164—105      4 Claims

ABSTRACT OF THE DISCLOSURE

A method and apparatus for centrifugally casting metal rings adapted especially for use in glass fiber spinning rotors, the molten metal of the ring being delivered to the inner surface of an annular holder from which tubes project radially inwardly so that the molten metal flows around and between the tubes and is solidified with the tubes imbedded therein.

---

This is a division of application Ser. No. 589,444 filed Oct. 25, 1966, now abandoned.

This invention relates to improvements in means and apparatus for the centrifugal production of fine glass and mineral fibers and refers more particularly to improvements in fiberizing rotors, orificed rings for use in same, means for lining the orifices of such rotor rings, and molds for fabricating such finely orificed rings.

U.S. Pat. 3,060,774, issued Oct. 30, 1962, "Core Shearing Device," inventor Joseph T. Warkoczewski discloses a device for shearing cores for use in centrifugal casting molds adapted to produce finely perforated metal rings. U.S. Pat. 3,040,398, issued June 26, 1962, inventor Warkoczewski, "Method and Apparatus for Forming Finely Perforated Rings," discloses a centrifugal casting mold for the production of finely perforated metal rings adapted for use in fiberizing rotors. U.S. Pat. 3,233,992, inventors Stephens et al., issued Feb. 8, 1966, "Apparatus for Production of Fine Glass Fibers" and Stephens et al. 3,233,990, "Method and Apparatus for Forming Fibers by Spinning Fluid Blast and Rotor," issued Feb. 8, 1966, disclose a centrifugal fiber forming process and a rotor therefor adapted to produce fine glass fibers and the like. U.S. Pats. 3,040,395, Warkoczewski, issued June 26, 1962, "Mold Core Loading Device Improvement" and 3,035,317, Warkoczewski "Mold Core Loading Device," issued May 22, 1962, both disclose means and methods of loading frangible cores into a centrifugal casting mold for production of finely perforated rings for use in glass fiberizing rotors. Pat. 2,991,519, Warkoczewski, "Mold for Forming Finely Perforated Rings," issued July 11, 1961, illustrates a centrifugal casting mold for forming finely perforated rings.

The previously listed prior art details a centrifugal fiberizing process for the production of fine glass and/or mineral fibers, as well as the structure of typical rotors used in said process, methods of and apparatus for casting the finely perforated or orificed rings used in the rotors themselves and details of said cast rings. The instant improvements are directed to developments in the molds for casting the finely perforated rings, the means utilized in said molds for forming the holes in said rings, structural improvements in the rings, per se, and improvements in the fiberizing rotors, such as the rotor shape, the rotor floor and the perforated rings forming the rotor side wall and the like.

In the practice of centrifugal processes for glass fiber manufacture, as taught in the Stephens references, supra, for example, there has arisen a quality versus cost problem which has resulted in a quality compromise. Rapid wear of the rotors used in the fiberizing process is the salient cause. Long rotor service yields low rotor cost, but rotors with holes worn out from long service produce low quality fiber. It is undesirable to have a large percentage of rotors operated for periods in excess of the maximum dictated by high product quality. However, restrictions on maximum rotor service are only partly successful in improving product quality because the service period during which high quality fibers can be produced varies greatly between individual rotors. Many rotors should be withdrawn from service at one quarter the allowed maximum time. The indefinite end point of the production of high quality fiber by any given rotor imposes a difficult policing problem on the manufacturing department. An obvious solution to this dilemma would be the utilization of a low cost rotor that would produce high quality products over its entire service life. This solution has been achieved by the development of the rotor and orifice ring utilized therewith disclosed herein.

The idea of lining orifice holes with an erosion resistant metal is not new. The art discloses an approach to improvement of static rayon spinnerets by pressing into each orifice hole a tiny machined collar made of platinum. None of these methods are practical at the high temperatures and stresses inherent in centrifugal glass fiber manufacture. The instant improvement involves the use of small diameter tubing made of erosion resistant material to replace the graphite/clay cores used in the orifice ring casting process disclosed in the previously listed patents. Such tubing is in effect welded into the orifice ring in the casting process. This forms a bond capable of standing the high temperatures and stresses of centrifugal fiber production. Platinum was selected for the tube material because of its unique ability to resist erosion in contact with molten glass. An alloy of 90% platinum and 10% rhodium has been successfully used for numerous years in 204-hole bushings. The orifices in these bushings have exhibited very little evidence of enlargement due to wear even after extensive service.

An object of the invention is to provide improved fiberizing rotors, orifice rings for fiberizing rotors, inserts defining the orifices in rings for fiberizing rotors and means for casting orifice rings for said rotors, which improvements result in fiber and mat produced by said rotors which are equal in quality and strength to product produced by new rotors of previous design while, additionally, the product from the improved rotor retains these properties, while the product from the older rotor deteriorates with rotor age.

Another object of the invention is to provide improved fiberizing rotors and structural parts thereof which permit the continuous production of high quality fibers at a lower rotor speed whereby to reduce orifice ring stress therein, promote longer bearing life, longer refractory life and longer drive belt life.

Another object of the invention is to provide an improved rotor construction which requires, under identical conditions, about the same burner cavity pressure to produce a given fiber diameter as does a new rotor of the old type yet which will not require the additional burner cavity pressure with age required by the rotor of the old type, whereby to average less such pressure over a period of time.

Another object of the invention is to provide a rotor and orifice ring for a rotor with permanent orifices, whereby to enable the more precise prediction of the average life of rotors and essentially eliminate the whole erosion variable, whereby to produce a condition wherein the life of the rotor is now a known function of the materials performance under stress at elevated temperature.

Another object of the invention is to provide an improved rotor and orifice ring therefor which is capable of an average service life some 9 times the service life of old style rotors at the same glass flow, whereby to greatly reduce the requirement of production of rotors per month and minimize the equipment and personnel required for production of same.

Another object of the invention is to effect improvements in apparatus and methods to minimize the time lost from production in changing rotors on a glass fiber production line.

An object of the invention is to provide cast metal rings having a plurality of uniformly spaced, uniform internal diameter holes or perforations of very small internal diameter therethrough, the rings themselves of high tensile strength material or metal having a long service life under extremely arduous conditions, the perforations through said ring lined with material which minimizes erosion in contact with molten glass.

Another object of the invention is to provide methods for and apparatus for centrifugally casting finely perforated rings around hollow tubes of material resistant to erosion in contact with molten glass, said tubes defining the perforations in the rings, the tubes permanently remaining in the resultant cast rings, said tubes so firmly retained as to readily permit machining of one or more of the surfaces of the ring to produce the desired thickness in the finished ring, thus permitting control of the character of one or more of the surfaces of the rings.

Other objects of the invention include the provision of a useable flat bottomed rotor with optimum strength and life characteristics as well as capacity for adjustment to erosion of the flat rotor floor due to molten glass attrition thereof.

FIG. 3 is a side, essentially sectional view of a centrifugal fiberizing rotor of improved construction, the rotor incorporating an improved finely perforated ring peripherally thereof for passage of molten glass or mineral substance therethrough in the fiberizing process. In the showings in side section of the ring and centrally thereof the platinum-rhodium tube lined orifices are shown relatively enlarged whereby to be seen in detail.

FIG. 4 is a plan view of the finely perforated ring utilized in the rotor of FIG. 3, a portion thereof cut away to show the orifices in the ring. (The detailing is insufficiently fine in this view to see the lining of said orifices.)

FIG. 5 is an enlarged view taken along the lines 5—5 of FIG. 4 in the direction of the arrows, from the outside of the ring, looking essentially radially inwardly, the said enlargement coupled with a second relative enlargement as in FIG. 3 for the purpose of illustrating details of the lining of the orifices of the ring.

FIG. 6 is a view along the line 6—6 of FIG. 5 in the direction of the arrows.

FIG. 7 is a ¾ perspective side view of one of the platinum-rhodium tubes utilized to line the orifices of the ring of FIGS. 3–6, inclusive.

The instant improvement relates to developments in the construction of a centrifugal glass fiber generating rotor orificed band, as well as the methods of producing same and the rotor constructible therefrom. In particular, it relates to a method of casting into the orificed ring band a plurality of orifice linings of special material selected for properties of increased resistance to glass erosion, corrosion and/or oxidation. The method would substitute a tube of suitable dimension, such as 0.010 to 0.030 inch inside diameter and 0.015 to 0.040 inch outside diameter and length in the vicinity of 0.75 inch for the frangible pencil leads used in the ring casting process described in my previous patents, supra. The tube material, for optimum results, is one with high melting point, so that it may resist the casting temperatures, and have high glass erosion and corrosion resistance and superior oxidation resistance. Such a material may be found in the family of platinum metals. An example of such material now available in small tube form is platinum 10% rhodium alloy which has a melting point of 3350° F. These tubes are retained in the orifices by contraction or shrinkage of the base band material which is commonly a nickel based stainless steel alloy. Thus, one is enabled to take maximum advantage of the properties of a platinum alloy which possesses high glass erosion resistance, but not the vital tensile strength required of the base band material.

Figure 1:
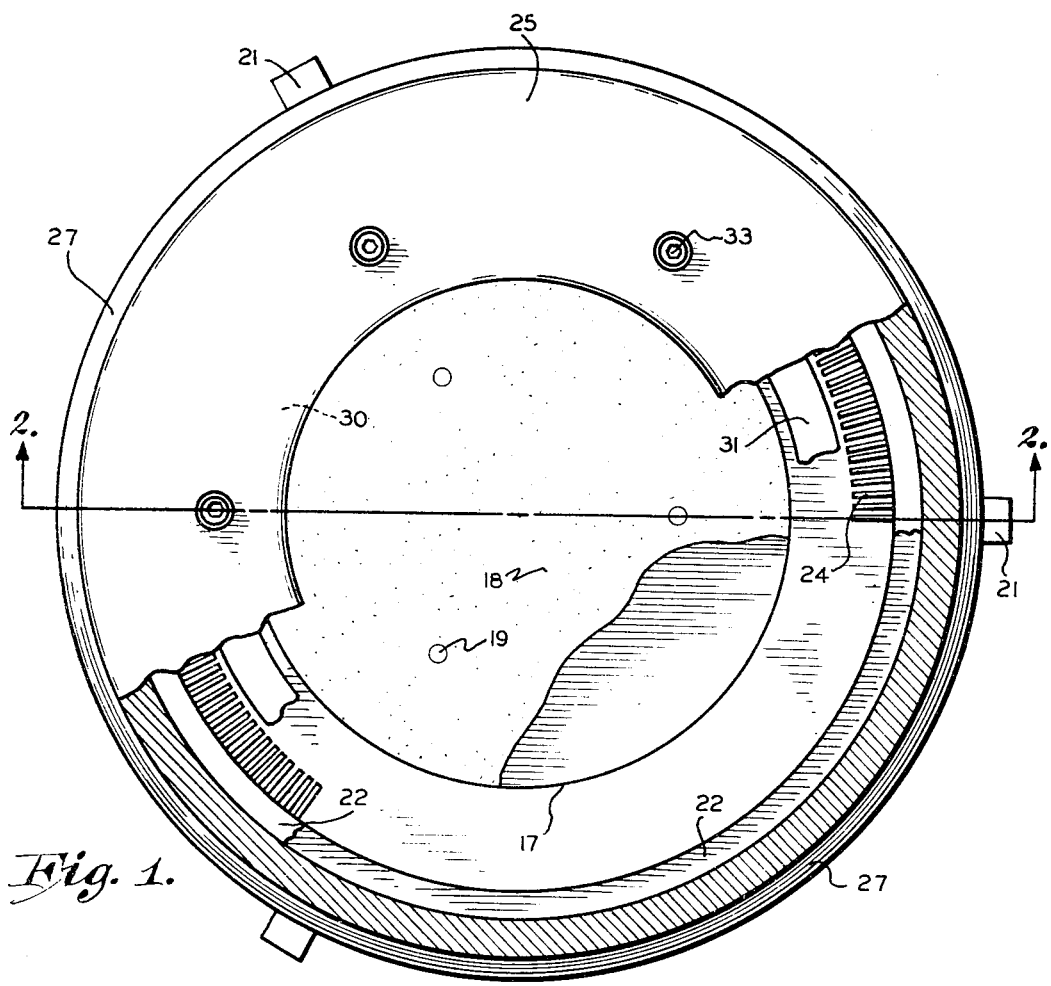
FIG. 1 is a top plan view of an improved centrifugal casting mold construction with parts cut away and in section to better illustrate the assembled relationship of the various parts thereof.
Figure 2:
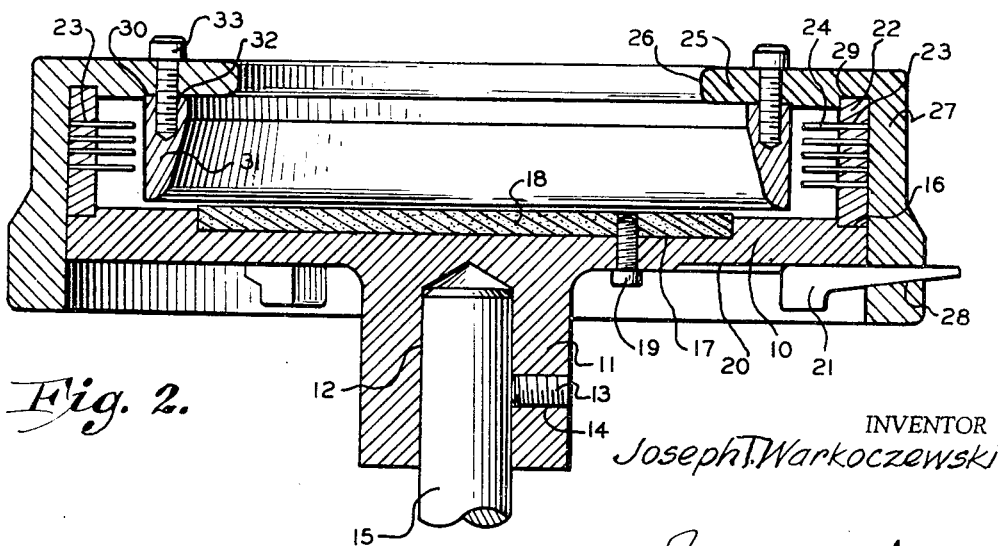
FIG. 2 is a view taken along the line 2—2 of FIG. 1 in the direction of the arrows.

Referring first to the mold construction of FIGS. 1 and 2, in my Pat. 2,991,519, issued July 11, 1961 "Mold for Forming Finely Perforated Rings," as well as some of the other patents mentioned, supra, there is shown apparatus for rotating such a centrifugal mold, as well as analogous mold constructions. Base plate 10 may be formed of cast iron or like material and has base hub 11 centrally thereof with socket 12 formed therein. Set screw 13 is threaded into opening 14 to grip the base hub 11 on shaft 15. Plate 10 is circular in plan view and has circumferential groove 16 thereon. Central recess 17, preferably circular in form, receives pouring insert of cold rolled steel 18 therein, said insert of slightly greater height than the depth of recess 17. Openings are formed through the underside of plate 10 to receive bolts 19 which thread into openings in the underside of insert 18. Radial slots 20 are spaced around the underside of plate 10 whereby to permit the insertion of pins or keys 21 in locking relationship to be described.

Casting ring or flange 22 is circular in plan view and fits at its lower edge into groove 16. The thickness of ring 22 is equal to the distance from the outer edge of plate 10 to the inner edge of groove 16. The outer diameter of ring 22 is preferably substantially that of the base plate 10. Ring 22 is formed of cast iron or like metal. A plurality of relatively fine diameter holes 23 are formed through ring 22. Ring 22 is preferably but not necessarily mounted at right angles to or normal to base plate 10, but holes 23 are necessarily radial to the axis of the shaft 15 and base plate 10. Openings 23 are preferably countersunk (not seen) on the outer face of ring 22. A plurality of hollow elongate tubes generally designated 24 (see FIG. 7) having an outer diameter substantially equal to the inner diameter of openings 23 or only slightly less than said inner diameter of openings 23 or only slightly less than said inner diameter are mounted within said openings 23 so as to extend radially into the cavity of the mold formed by ring 22 mounted on base plate 10. Openings 23 in flange or ring 22 are preferably of uniform inside diameter and have uniform diameter openings into and out of the inside and outside faces of flange or ring 22, save for the countersunk portions thereof.

Cap 25 has a preferably circular central opening 26 above pour plate 18. Side wall 27 of cap 25 fits down over the entire ring 22 and extending below, at least in portions thereof, the lower face of plate 10. Openings 28 extend through the side wall 27 in the area below bottom plate 10 and are preferably tapered from a greater thickness inwardly to a lesser thickness outwardly whereby to receive positioning and locking pins 21 therein. Openings 28 are spaced circumferentially of the cap side 27 whereby to be opposite grooves 20 for the insertion of said pins 21. A circumferential groove 29 is formed in the underside of the peripheral portion of cap 25 whereby to receive the upper portion of ring 22 therein.

The tubes 24 employed as casting cores in the mold are preferably trimmed to a uniform length so as to extend centrally of the mold cavity a uniform distance as seen in FIG. 2. The inner and outer diameters of the platinum-rhodium tubes 24 have previously been mentioned. The clearance between the outer surfaces of tubes 24 and the inner surfaces of openings 23 should be small as possible to get relatively secure positioning of the tubes in the flange 22, for example, 0.002 inch maximum clearance. This clearance, however, must not be too small to prevent insertion of the tubes into the mold ring 22 from the outside. A typical inward extension of the tubes 24 into the mold would be 0.500 inch.

The inward extension of the tubes into the mold, their outer diameter, etc. are somewhat variable. In the case of the instant tubes, as opposed to the earlier frangible centrifugal casting elements, the inside diameter of the tubes defines the size of the fiberizing orifices. Therefore, the limits on the outer diameter of the tubes are essentially such as to minimize the retention of precious metal within mold ring 22. The glass fibers desired to be produced in the processes disclosed in the above listed patents are of the order of 4 to 10 microns after extrusion through the holes in the cast ring and gas blast attenuation. A typical alloy composition for centrifugal casting in a mold as disclosed would be chromium 20.5 to 23% by weight; iron 17 to 20%; molybdenum 8 to 10%; cobalt 0.5 to 2.5%; tungsten 0.20 to 1.0%; carbon 0.05 to 1%; silicon 0.5 to 1%; manganese 1% and the balance nickel. Such an alloy has the desired high temperature and high tensile strength characteristics required in the glass fiber production process.

All of the foregoing, save for the use of hollow tubes 24, is essentially the same as described in my Pat. 2,991,519 or my Pat. 3,040,398. An improvement in the mold construction utilizes the addition to the underside of cap 25 of a relieved zone 30. A downwardly extending flange ring or splash guard 31 is provided having a circular shape in horizontal section (FIG. 1) and preferably tapering from a greater upper thickness to a lesser lower thickness. The height of ring 31 is slightly less than the distance from the underside of the relieved zone 30 to the upper or inner side of base plate 10. The inner diameter of ring or flange 31, at the lower end thereof is necessarily somewhat greater than the outer diameter of pour plate 18. Flange 31 has internally threaded openings 32 therein whereby to receive bolts 33 which pass through openings in the relieved zone area of cap 25 whereby to rigidly yet removably position ring or flange 31 with respect to the pour plate 18 and the tubes 24.

The purpose of the splash guard flange or ring 31 is to minimize the technology required to be associated with or incorporated in tubes 24 in order to insure that the tubes themselves are not plugged by poured metal in the centrifugal casing process. Therefore, the length of the splash guard 31 must extend down below the lowermost row of tubes 24 in the mold flange ring 22. The clearance from plate 10 must be sufficient that the metal can readily pass thereunder to move outwardly against the inner surface of flange ring 22 to cast the ring. It is possible to do away with splash ring 31, but only by such expediences as utilizing hairpin tubes (U-shapes of tubes) with the closed end of the U inwardly of the mold or by pinching off the ends of the tubes, or filling the tubes with graphite. Such procedures are feasible in some or most cases, but generally make the flange ring considerably harder to load, require additional processing of the tubes, and often distort the tubes undesirably. It is most desirable to employ open ended tubes (both ends), unfilled, with the splash guard, as shown, in order that an inspection may be made before the casting process and after the insertion of the tubes into the mold ring 22 whereby to ascertain that all of the tubes are free and clear from obstruction.

One of the most desirable effects of the instant casting process and the results therefrom is the ability to produce uniform controlled orifice thicker rings or bands.

Two other methods of providing perforated rotor rings commonly used are the "Elox" electric arc drilling process, wherein the optimum ring structure approaches a thickness of 0.100 inch, and the frangible lead casting process set forth in my previous processes, the latter typically resulting in finished ring thicknesses of 0.125 inch. In the instant process, the rings can be cast almost as thick as desired, but certainly a satisfactory thickness of 0.150 inch is easily achievable. This is without deterioration in the lined orifices or the character of the ring itself. The structural reasons for increased ring thickness include increased stiffening of the band, longer service life with far less early failure, less rupturing at the welds of the ring to the rotor, less rupturing at the planes of the orifices and the like.

The practice of the instant method of casting the ring is considerably like that described in my previous patents. The tubes 24, of uniform desired length are placed in the openings 23 of ring 22 extending interiorly of the mold cavity. This process may be done by hand but is preferably assisted by devices such as those shown in my Pat. 3,040,395 or 3,035,317, supra. Cap 25 is then fitted over ring 22 and keys 21 pressed through grooves 20 into openings 28 to lock the cap in place of the mold. The cap 25 has the splash guard ring 31 positioned therein. Sufficient clearance must be provided between the ends of the tubes 24 and the outer surface of guard 31 to avoid any deflection, contact with or distortion of the tubes 24. The mold is then placed on a shaft 15 of a spinning device such as that seen in my Pat. 2,991,519. Rotation of the mold with the tubes 24 therein by such device is then begun.

A preheat of the mold with an oven or the like applied to the periphery thereof to avoid chilling of the molten metal when poured therein is preferably undertaken, a typical preheat temperature being 1100° F. The metal is poured as described in my 2,991,519 patent, supra, a typical rotation rate for the mold during the pouring operation being 1100 r.p.m.

The metal at a typical temperature exceeding 3000° F. moves out immediately to the periphery of the mold under splash guard 31 and up flange or ring 22 among and including tubes 24. The spinning of the mold is then continued for any desired solidifying period. The rotation of the mold is then stopped and the cooling of the ring permitted for a desired period to permit convenient handling, for example, 2 hours. Preferably, then, the connections between the tubes and the cast ring in the mold are broken or cut by such action as passing a sharp object such as a saw peripherally of the ring between the ring and the mold ring 22. The cast ring, in cooling, shrinks away from the mold ring 22 sufficiently to permit this operation. Alternatively, the cast ring may be forced out of the mold ring by a punching or pressing operation, the mold ring and cast ring having been removed together from the mold assembly after removal of the cap 25. The cast ring is typically cast of extra thickness to permit machining of either or both the inner and outer surfaces of the ring to control the thickness of the ring and/or the surface characteristics thereof. Typical thicknesses of a cast ring may range from 0.10 inch to 0.200 inch, after machining.

Referring to FIG. 3, therein is shown a fiberizing rotor comprising an improvement over the rotor disclosed in the Stephens et al. patents, supra. As disclosed in said patents, the task of the fiberizing rotor is to receive a substantially continuously flowing stream of molten glass (typically a poured column of glass centrally received of the bottom plate of the rotor) and distribute same peripherally by centrifugal force onto a peripheral, orificed ring through which the glass passes in fine streams or flows. As the glass streams emerge from the periphery of the rotor, trailing in the direction of rotation of the rotor, they are attenuated further by a high velocity gas blast which is passing immediately peripherally of the rotor, downwardly and generally in the direction of rotation of the rotor.

The rotor construction, therefore, must take into account the following capacities or functions. Thus, it must receive a continuous flowing stream of molten glass from a bushing. This is accomplished by providing, in the top wall 40, thereof, an enlarged opening 41 of considerably greater diameter than the supply stream of glass, which, typically, pours centrally down through the enlarged opening without contacting any part of the rotor save for the bottom plate or floor 42 thereof. Secondly, the rotor must be rotated at high speed, this function being accomplished by aid of an elongate, large diameter, vertical collar 43 fixedly attached to wall 40 which is externally threaded as at 44 at the upper end thereof for connection to a drive tube of the manner shown in the Stephens patent, supra. The internal diameter of collar 43 is the same as the internal diameter of opening 41. The periphery of the rotor is made up of the circumferential edges of the upper and lower plates 40 and 42 and, attached therebetween by circumferential welds 45 and 46, a finely perforated ring generally designated 47. The latter has tube-lined perforations 48 evenly distributed therearound, yet spaced from the upper and lower edges thereof. This ring construction is shown in detail in FIGS. 4–6, inclusive, with the exception that, in the views of FIGS. 5 and 6, the lower edge of the ring has been cut short for illustrative space conservation purposes and, essentially, the perforation or orifice free portions of the upper and lower extremities of the ring in the views of FIGS. 5 and 6 should be essentially equal in length (as in FIG. 3). In all of the views of FIGS. 3–6, inclusive, the orifices are exaggerated in size for illustrative purposes. Typical dimensions of same have been given earlier, as defined by the platinum-rhodium tubes 49, which are exaggerated in size in all of these views and, thus, the relative size of the openings or orifices with respect to the ring. Thus, there may be 2600 holes or tube defined holes in a ring. A nut 56, hexagonal in shape to aid in attaching the rotor to a drive or torque tube (not seen) is fixedly attached to the underside of bottom wall 42 centrally of same directly below the center of collar 43 and is of sufficient "diameter" or horizontal section area to considerably exceed the "waver" diameter of the stream of glass which will impact on the rotor floor 42 thereabove. The welds 45 and 46 preferably are circumferentially continuous and extend inwardly the entire depth of the ring 47 whereby to be visible circumferentially around the rotor by a mirror inserted centrally at collar 43.

In operation of the rotor, essentially as set forth in the Stephens et al. patents, supra, with the rotor positioned on a torque or drive tube as seen in the Stephens et al. patents, the preheating and rotation of the rotor are initiated. Thereafter, a gravity flow of molten glass in a continuous stream downwardly centrally of the collar 43 is commenced from a source of glass which may be a conventional refractory furnace connected to a one orifice platinum bushing. The stream of glass falls onto floor plate 42 of the rotor over nut 56, from which point the glass is immediately moved peripherally of the rotor by centrifugal force. The quantity of glass flowed into the rotor must be regulated to the amount passed out of the orifices 48 in the side wall or ring 47. The attrition of the upper surface of plate 42 may eat down considerably into nut 56, whereby to form a depression therein which may result in the formation of a glass flow analogous to that effected in the rotor seen in the Stephens et al. patents, supra. The purpose, however, of the rotor nut, aside from its obvious function of tightening and loosening the rotor on the torque or drive tube, is not to directly furnish such opportunity to form a depression, but to furnish reserve material at the point of greatest glass attrition in the rotor.

As the outwardly flowing glass from the impact point above nut 56 moves up the ring 47, it is forced outwardly by centrifugal force through the openings 48 in a plurality of small diameter molten streams. As the streams issue from the outer face of said ring, they trail the rotor in a direction opposite the direction of rotation thereof. The gas blast (not seen) thereafter attenuates the fibers to the desired degree.

It is most desirable, in a long life rotor, to have a rigid, stable, rotor configuration. It is also desirable to move the glass as quickly as possible from the impact point in the rotor to the ring and therethrough. It is further most desirable to have a rotor configuration which minimizes any working or motion of the parts thereof under the high stresses, high rotational velocities and high temperatures of the process. Yet further, it is desirable to have a stable hole or orifice size in the rotor ring so that variations will not have to be made in the gas blast flow, as the rotor ages, in the temperature of the glass being supplied to the rotor, the quantity of glass, etc. Yet further, it is desirable to have a rotor of simplest configuration for manufacturing purposes and with self compensating, cooperating parts to minimize the effects on long life of erosion or attrition of any particular parts. This has been achieved in the present rotor.

Thus, both upper plate 40 and lower plate 42 are essentially flat. The slight upward bowing of plate 40 seen in the view is an artifact of the particular method of manufacture and the attachment process of the collar 43 by welding or other fixed attachment thereto. Thus for practical purposes, it is most desirable that 40 and 42 be essentially straight or flat. This minimizes material therein, bowing and fluctuation of same under high rotational stresses at high temperatures and maximizes strength. Likewise, same permits a straight, flat, continuous wall outward to ring 47, with the ring itself comprising the entire vertical dimension of the side wall. The welds 45 and 46, due to the upper and lower edges of the ring 47 constituting the peripheral wall, can be checked for completeness by a mirror scan from the interior of the rotor and permit optimum and full strength attachments. Thus, the glass carrying areas, namely, flat plate 42 and ring 47, are minimum in area exposed to glass and thus a minimum quantity of glass furnished to the rotor will directly reach the ring and most quickly wet the topmost holes of the ring. It is necessary that all holes be wetted, else spitting and shot production from the rotor will tend to result. This structure also results in more even loading of the rotor. The straight, flat plates 40 and 42 minimize working of welds 45 and 46. The provision of the enlarged nut 56, of greater area than the waver diameter of the furnished glass stream to the rotor permits the use of a minimum thickness plate 42 as erosion of the metal of plate 42 over the nut may go down into the nut a very considerable distance without impairing the function of the rotor whatsoever.

Since the orifices or lined perforations of the ring are essentially permanent (that is, save for possible blowing out of one or more tubes, the tubes outlast the ring itself or the welds 45 and 46), there is no attrition of the holes or orifices 48 in the effective life of the rotor and, thus, there is no transformation of the rotor from one with minimum size holes to one with maximum size holes with resultant required variation of glass temperature, glass quantity supplied to the rotor, gas blast volume or position outside of the rotor, or the like. This means also, and very important, that one can work with a minimum head of glass at the inside surface of the peripheral ring and the original hole size (or tube internal diameter size in the orifice) can be dimensioned for a minimum glass head at a given rotor blast and supply of glass to the rotor, rotational rate, rotor size, etc. Thus, at all times, there is a minimum quantity of glass in the rotor and a minimum load on all parts of the rotor, particularly ring 47, as one knows what the behavior of the ring will be. This minimizes bowing of the rotor ring 47 itself due to glass load (arching in transverse section), which structural change is also minimized because of the stable configuration of upper and lower plates 40 and 42. The glass head thickness in a given rotor may be determined by inspection afterwards (lining of the upper and lower plates 40 and 42 inner surfaces) or in operation, where the thickness is seen through the incandescent rotor itself as a shadow.

A seal weld 51 is provided around nut 56 for the purpose of retaining the nut on the bottom plate 42 after plate 42 is completely eaten through centrally of nut 56. It should be noted that erosion is effected generally over plate 42, not localized, if same is centered. If same is off center or wavering, there is a tendency to corrode centrally due to glass corrosive vapor or fume production, etc. The ability to cast or fabricate the instant rotor ring in greater thicknesses also maximizes the effectiveness of the instant rotor and long life thereof, as such greater ring thickness tends to give rigidity at the point of greatest load, namely the glass-passing periphery of the rotor. It should also be noted that, with plates 42 and 40 flat and straight, the rotor diameter remains essentially constant.

The waver diameter of the glass stream fed to the rotor refers to lateral motion or translation of same with respect to its impact point in the rotor.

It is necessary that the mold preheat temperature be sufficient that the tube surfaces weld into the metal of the cast ring. Yet further, it is necessary that the heat or temperature of the poured metal into the centrifugal mold be below, yet close to, the melting point of the tubes. Thus, a preheat of the mold, before pouring, with the tubes therein, of some 1100° F. is required. The melting point of the tubes is approximately 3350° F. The alloy melting point is approximately 2450° F. The pouring temperature of the alloy is approximately 3200° F. some 750° F. above its melting point. If the latter is substantially lowered, the tubes will tend to pop from the casting in use. In such case, the desired and necessary tube-casting surface weld will not be present. This weld is stronger than the surrounding metal, as may be demonstrated by breaking the casting across the tubes cast therein. In such case the tubes stay in the casting though the latter and the tubes break.

The outward and downward taper of the splash guard on the inner surface thereof aids the metal feed outwardly thereof. The splash guard may be integral with the cap.

A typical casting thickness before machining is 0.375 inch.

Thus it is seen that great advantages have been provided in all facets of fiberizing rotors, the orifice rings thereof, the orifices per se in the rings, the methods and apparatus of production of same, and the like.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In apparatus for forming finely perforated rings comprising a centrifugal casting mold,
said mold having a substantially circular base plate,
a first ring mounted on said base plate concentric to the center thereof and at a substantial angle thereto forming a mold cavity centrally thereof,
said first ring having a plurality of relatively small diameter openings extending entirely therethrough,
means for rotating said base plate around the central axis thereof,
a circumferential backup ring concentrically mounted with respect to said first ring externally of the outer ends of said openings,
a cap for said flange ring peripherally connected to said backup flange and having a central opening therein of lesser inner diameter than the first ring inner diameter, and
means removably fixing the backup flange relative to the first ring whereby to rotate therewith on said base plate,
the improvement which comprises a plurality of mold core elements received in said first ring openings and extending inwardly of said first ring in a direction substantially normal to the axis of rotation of said base plate,
said mold core elements comprising hollow tubes of a substance resistant to molten fiberizing material.
the inward extension of said tubes past the inside surface of said first ring being greater than the thickness of a ring cast in said mold.

2. Apparatus as in claim 1 including the provision of a splash guard extending downwardly from the underside of said cap closely adjacent the base plate and below the lowermost tube elements received in said first ring, said splash guard comprising a circumferential ring.

3. A method for making a rotor for fiberizing molten mineral materials, in which the rotor has a cylindrical wall with small diameter openings extended radially therethrough, which method comprises inserting small diameter tubes of platinum metal into radial apertures formed in an annular holder, with the tubes extended radially inwardly of the inner wall of the annular holder, preheating the assembly of tubes and holder, rotating the heated assembly and centrifugally casting nickel based stainless steel alloy against the inner wall of the annular holder around the projecting inner end portions of the tubes but without blocking the inner end openings of the tubes, cooling the cast alloy to form an annulus having the tubes welded therein, and after the cooling cutting the tubes substantially at the interface between the annular holder and the annulus formed.

4. A method as defined in claim 3 in which the centrifugal casting is effected by introducing the metal to be cast in molten condition adjacent an edge of the annular holder and thereby provide for flow of the molten metal axially of the holder between and around the portions of the tubes projecting radially inwardly from the holder.

References Cited

UNITED STATES PATENTS

| | | | |
|---|---|---|---|
| 2,649,652 | 8/1953 | Duncan | 164—108 |
| 2,931,062 | 4/1960 | Leaman | 65—15 X |
| 3,035,317 | 5/1962 | Warkoczewski | 164—302 X |
| 3,040,395 | 6/1962 | Warkoczewski | 164—302 X |
| 3,040,398 | 6/1962 | Warkoczewski | 164—302 |
| 3,276,082 | 10/1966 | Thomas | 164—105 X |

S. LEON BASHORE, Primary Examiner
R. L. LINDSAY, JR., Primary Examiner

U.S. Cl. X.R.
65—15, 374; 164—108, 112, 114, 288, 302